(12) United States Patent
Talley et al.

(10) Patent No.: US 7,561,289 B2
(45) Date of Patent: Jul. 14, 2009

(54) METHOD FOR EDITING A PRINTED PAGE

(75) Inventors: Micheal Talley, Boise, ID (US); Dana Jacobsen, Boise, ID (US); Terry Fritz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 10/718,179

(22) Filed: Nov. 20, 2003

(65) Prior Publication Data

US 2005/0114772 A1    May 26, 2005

(51) Int. Cl.
*G06F 15/00* (2006.01)
(52) U.S. Cl. ............ 358/1.15; 358/1.11; 358/1.18; 358/462; 358/452; 358/453; 382/290; 382/292; 382/301
(58) Field of Classification Search .......... 358/1.11, 358/1.15, 1.18, 462, 452, 453; 382/290, 382/292, 301
See application file for complete search history.

(56) References Cited

U.S. PATENT DOCUMENTS

| 3,611,291 | A | * | 10/1971 | Frank ............... 382/182 |
| 5,544,045 | A | | 8/1996 | Garland et al. |
| 5,761,340 | A | * | 6/1998 | Suzuki ............. 382/189 |
| 5,870,624 | A | * | 2/1999 | Kikinis ............. 710/2 |
| 6,064,766 | A | * | 5/2000 | Sklarew ............ 382/189 |
| 6,910,184 | B1 | * | 6/2005 | Yano et al. ......... 715/526 |
| 7,068,387 | B2 | * | 6/2006 | Ahne et al. ......... 358/1.15 |
| 7,130,066 | B1 | * | 10/2006 | Kanematu ........... 358/1.15 |
| 7,131,061 | B2 | * | 10/2006 | MacLean et al. ..... 715/210 |
| 2002/0054778 | A1 | * | 5/2002 | Ericson et al. ...... 400/76 |
| 2002/0186392 | A1 | | 12/2002 | Ahne et al. |
| 2003/0093384 | A1 | * | 5/2003 | Durst et al. ........ 705/64 |
| 2004/0141200 | A1 | * | 7/2004 | Minami et al. ...... 358/1.15 |

FOREIGN PATENT DOCUMENTS

JP           01308672      12/1989

OTHER PUBLICATIONS

"Apparatus for Component Blind Assemblies", Research Disclosure, 1 pg., Mar. 2003.
Jacobson, Dana, "Enhancing OCR of Printed Documents Using Out-Of-Band Data", Research Disclosure, 1 pg., Mar. 2003.
"Two-Dimensional Symbols", PDF417, 3 pgs., Jul. 26, 2003. <www.pdf417.com>.

* cited by examiner

*Primary Examiner*—Chan S Park (57) ABSTRACT

A method of editing a printed page comprises feeding a printed page into a multifunction printer with the printed page including text and at least one handwritten edit symbol. A first electronic printable file, which corresponds to the text of printed page, and at least one electronic edit symbol, which corresponds to the at least one handwritten edit symbol, are obtained via the multifunction printer. Via the multifunction printer, the first electronic printable file is electronically modified with at least one electronic edit instruction, which corresponds to the at least one electronic edit symbol, to create a second electronic printable file that includes the text modified according to the at least one handwritten edit symbol.

12 Claims, 5 Drawing Sheets

METHOD FOR EDITING A PRINTED PAGE

BACKGROUND

Editing a document on a computer-based word processor is convenient. Mere keystrokes at a computer keyboard change the text of the document. The document can be changed as often as desired without using any paper. When a final version of the document is achieved, then the user prints out the document via a printer.

Even though a document may look acceptable when viewed during its creation with the computer, the reader may later detect errors upon reading a printed copy of the document. In addition, many documents are edited as printed documents, as a great number of people still have a preference for reading and editing documents on paper rather than reading the documents electronically through a display of the computer. In this case, after the desired changes are marked on the printed document, a user must take the edited printed document and return to the computer to make the desired changes in the electronic copy and reprint the document on paper. For people who like to first review and edit paper documents, this situation requires two editing steps: first making the edits and second implementing the edits via the computer. A third step of transporting the document is added when the printed document is at a location distant from the computer that generated the document or computer media storing the document. Finally, in many cases, an electronic copy of the printed document no longer exists or is otherwise unavailable.

For these reasons, more convenient ways of editing printed documents would desirable.

DETAILED DESCRIPTION

Embodiments of the present invention are directed to editing a printed page via a multifunction printer. A multifunction printer conveniently receives printed pages that have edit symbols handwritten on the printed pages and implements those handwritten edit symbols electronically, independent of a host computer. Accordingly, a user need not manually enter those editing changes at a computer or other input device. After the multifunction printer automatically implements the editing changes, the revised document can printed, stored, or sent elsewhere. In addition, in some embodiments, after the multifunction printer recognizes the handwritten edit symbols on the printed pages, a host computer associated with the multifunction printer can be used to assist the multifunction printer in electronically implementing the changes to the document. Accordingly, implementing edits on a printed document is greatly simplified. A user can simply write edit symbols onto a printed page and then feed those edited pages into a multifunction printer which automatically implements those edits to revise the document, with or without the assistance of a host computer.

Figure 1:
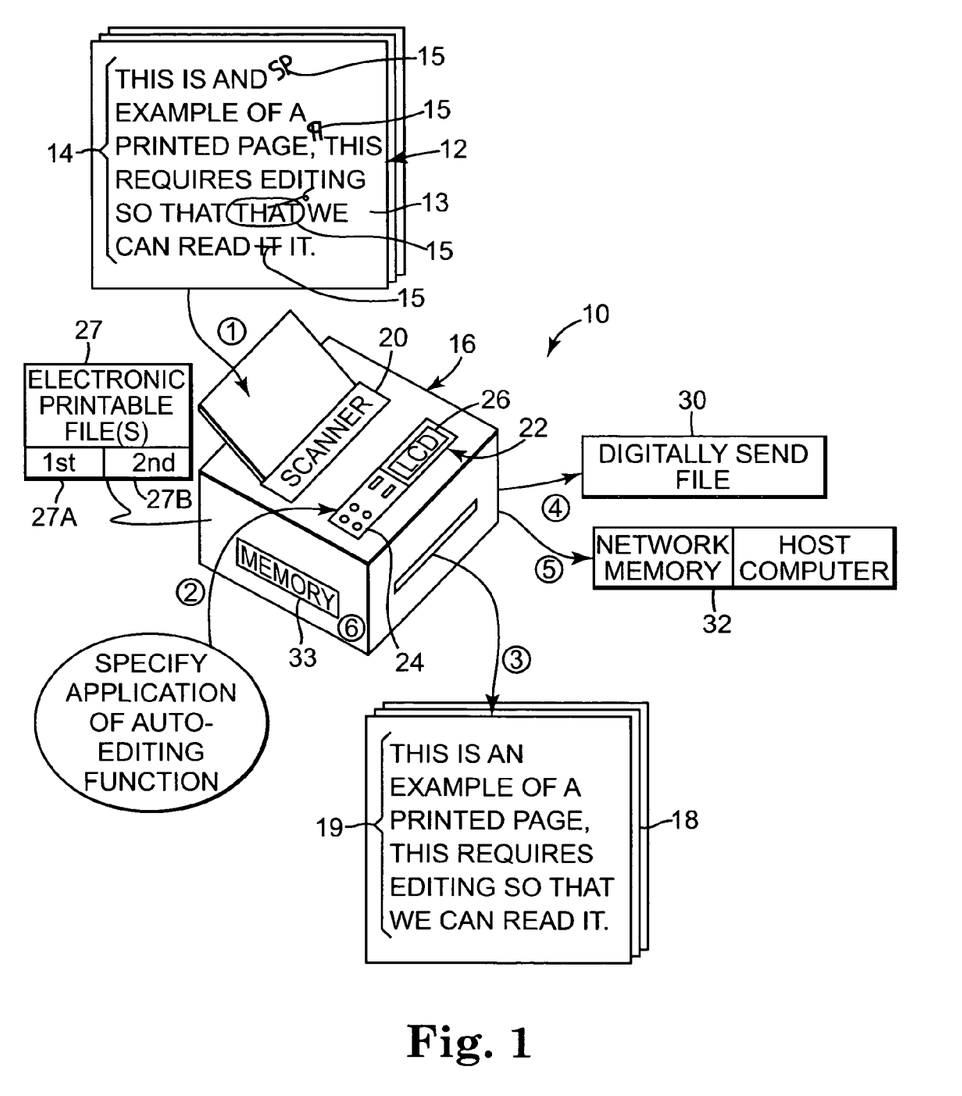
FIG. 1 is an illustration of a method of using a multifunction printer to electronically edit one or more printed pages, according to an embodiment of the present invention.

One exemplary embodiment of the present invention is shown generally in FIG. 1 as system and method 10. In method 10, page(s) 13 of printed document 12 having text 14 and handwritten edit symbols 15 are fed into multifunction printer 16 (as shown by directional arrow 1). Text 14 comprises characters, numbers, words, punctuation etc. As shown in FIG. 1, handwritten edit symbols 15 include, but are not limited to, a spelling symbol (sp), a paragraph symbol (¶), and a strikeout symbol (-----). Spelling symbol 15 is shown directing spelling correction for "AND", while paragraph symbol 15 is shown directing formatting correction as a new paragraph at the second instance of "THAT". Strikeout symbol 15 is shown directing deletion of a second instance of "IT" in the last sentence of printed page 13.

Page(s) 13 are scanned by scanner 20 of multifunction 16, processed by optical character recognition processes as needed (shown later in FIG. 2) to create electronic printable file 27, and electronically edited via multifunction printer 16 to produce revised printed pages 18. In particular, by activating an electronic editing function at user interface 22 via keypad 24 and display 26 (as shown by directional arrow 2), multifunction printer 16 identifies handwritten edit symbols 15 in printed pages 13 as electronic edit symbols, and then electronically applies electronic edit instructions corresponding to those electronic and handwritten edit symbols 15 to first electronic printable file 27A (which corresponds to printed page 13). Multifunction printer 16 then prints second electronic printable file 27B, which includes text (19) modified according to handwritten edit symbols 15, as printed pages 18 (as shown by directional arrow 3).

Alternatively, multifunction printer 16 is equipped to digitally send second electronic printable file 27B as a file (e.g. text file, image file) to a recipient (as shown by directional arrow 4), to store second electronic printable file 27B in network memory of a host computer 32 (as shown by directional arrow 5), or store second electronic printable file 27B in memory 33 of multifunction printer 16 (shown by marker 6).

Electronic printable file 27, including first and second electronic printable files 27A, 27B, comprises a universal format file that is generally device-independent. These files are commonly known as page description files (or printer description files) and can be edited, modified, and printed using tools other than a word processing program or text editor of a personal computer. Examples of an electronic printable file comprise a portable document format (PDF) file, PostScript file, printer control language (PCL) file, as well as other file formats known in the art that function as page description files. This feature allows multifunction printer 16 to electronically edit printed document 12 independent of the device that created printed document 12, and without the large amounts of memory that would be used to store and use a word processing program in multifunction printer 16. However, in another aspect of method 10 described in more detail in association with FIGS. 2-3, electronic printable file 27 comprises a text editable file that is editable by a text editor of multifunction printer 16 or by a text editor of computer 32.

Accordingly, method 10 of the embodiment of FIG. 1 permits multifunction printer 16 to identify handwritten edit symbols 15 on one or more printed pages 13 of printed document 12, electronically applies those edit symbols by modifying electronic printable file 27, and then reprinting the corrected document.

Figure 2:
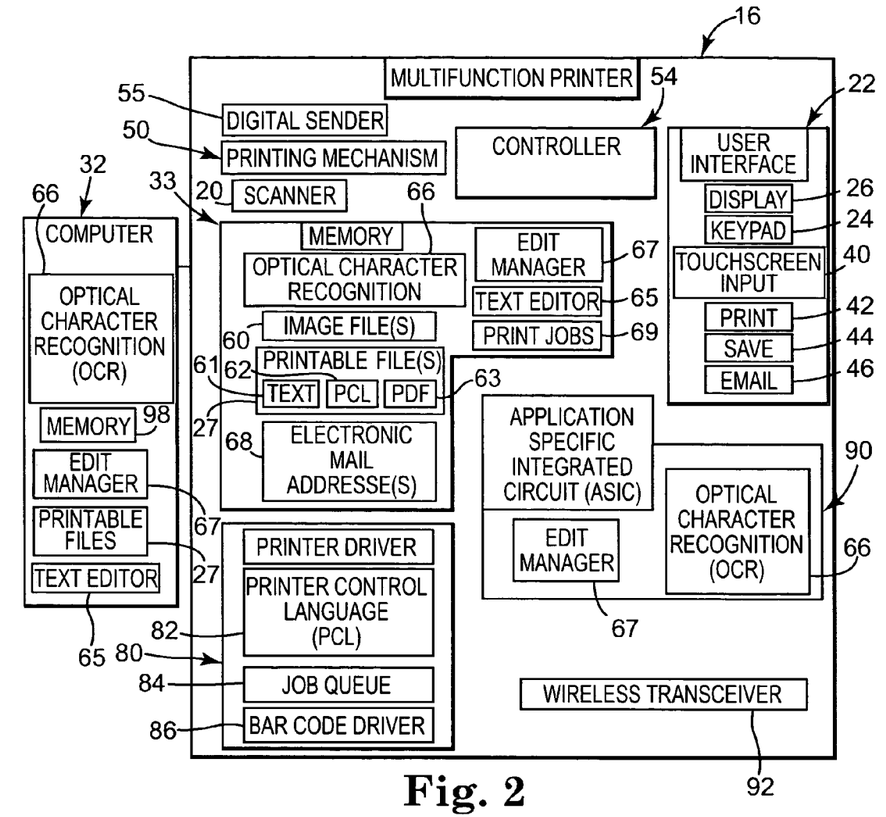
FIG. 2 is a block diagram of a multifunction printer, according to an embodiment of the present invention.

Method 10 is performed via multifunction printer 16 without the assistance of a computing device (e.g., independent of host computer 32 or other computing device), although connection to a computing device during performance of method 10 is not precluded. In other words, all of the functions for electronically editing printed page(s) 13 are performed exclusively by multifunction printer 16. However, as shown in FIG. 2, in some embodiments, method 10 can be performed in association with a computing device, such as host computer 32, to assist in functions such as optical character recognition, memory functions, and/or applying electronic editing instructions to first electronic printable file 27A (after electronic edit symbols are recognized by multifunction printer 16). This feature is described in more detail in association with FIGS. 2-3.

FIG. 2 illustrates multifunction printer 16 in greater detail. As shown in FIG. 2, multifunction printer 16 includes scanner 20, user interface 22, printing mechanism 50, memory 33, controller 54, and digital sender 55, print jobs 69, and printer driver 80. Multifunction printer 16 also comprises application specific integrated circuit (ASIC) 90 and wireless transceiver 92, which can be omitted in some embodiments. In some embodiments, computer 32 also can be used with multifunction printer 16 and can comprise one or more of electronic printable files 27, text editor 65, edit manager 67, optical character recognition function 66, and memory 98.

Scanner 20 of multifunction printer 16 comprises a well-known scanner technology for scanning printed pages fed into multifunction printer 16.

User interface 22 of multifunction printer 16 is used to access and manage all of the conventional features of multifunction printer 16 (e.g., start printing, stop printing, etc.), as well as for reviewing and managing features of multifunction printer 16 in accordance with an embodiment of the present invention, such as electronically implementing handwritten edit symbols 15 on printed document 12.

User interface 22 comprises keypad 24, display 26, print function 42, save function 44, and electronic mail function 46. Keypad 24 permits entry of alphanumeric and/or symbolic characters to permit a user to control edit manager 67. Display 26 shows results of the use of keypad 24 and the status of functions of multifunction printer 16, including edit manager 67. In some embodiments, display 26 also can comprise touchscreen input 40 to permit operation of functions of multifunction printer 16 through display 26 and to permit entry of additional editing instructions.

Print function 42 of user interface 22 permits activation of printing mechanism 50 while save function 44 permits storage of digital image file 60 (from scanning) and/or electronic printable file 27 (from optical character recognition) in memory 33. Print function 42 is further used, in cooperation with edit manager 67, to specify that the modified electronic printable file will be printed as pages 18. Alternatively, electronic mail (email) function 46 is used, in cooperation with edit manager 67, to specify that a modified electronic printable file 27 (e.g., second electronic printable file 27 B) is to be digitally sent from multifunction printer 16 using an electronic mail address 68 from memory 33, or which is entered by keypad 24.

Printing mechanism 50 of multifunction printer 16 comprises a well-known printer technology for printing pages from electronic printable files 62 stored in memory 33.

Memory 33 of multifunction printer 16 includes one or more digital image files 60, and one or more electronic printable files 27, text editor 65, optical character recognition function 66, edit manager 67, electronic mail addresses 68, and print jobs 69. Electronic printable files 27 were previously described in association with FIG. 1, and include printable document format (PDF) files 63, printer control language (PCL) files 62, and other types of page description files. In some embodiments, electronic printable files 27 also can comprise text editable files 61.

Print jobs 69 in memory 33 contain pages recently printed by multifunction printer 16 that are stored for use in electronic editing. Accordingly, in one aspect of method 10, when a user desires to electronically edit a printed page 13 via multifunction printer 16, multifunction printer 16 already has an electronic copy of the text of printed pages 13 so that printed page 13 need not be optically recognized to obtain electronic text before applying electronic edit instructions 158. To do so, a user can enter into user interface 22 an alphanumeric identifier for a printed page 13 as printed page 13 is fed into multifunction printer 16 to enable retrieval of a corresponding electronic printable file 27 from memory 33 for use in electronic editing. For example, in some embodiments, each print job 69 also can comprise an alphanumeric identifier for recalling an electronic printable file 27 corresponding to a particular print job 69.

Memory 33 also stores digital image files 60 during optical character recognition or stores electronic printable files 27 so that they are available for editing via multifunction printer 16. For example, in some embodiments in which printed page 13 is fed into multifunction printer 16 for electronic editing, multifunction printer 16 uses an electronic identifier of printed page 13 to locate and obtain electronic printable file 27 from memory 33 that corresponds to that printed page 13. This feature will be described in more detail in association with FIGS. 5-6. Memory 33 also can store electronic mail addresses 84 for use in digitally sending (via digital sender 55) revised electronic printable file 27 (e.g., second electronic printable file 27B) to a recipient as electronic mail message 30.

Memory 33 of multifunction printer 12 comprises computer readable media, stores any related software, and can include any combination of volatile or non-volatile memory, such as floppy disks, hard disks, CD-ROMs, flash memory, read-only memory (ROM), and random access memory (RAM).

Controller 54 of multifunction printer 16 directs operation of all components and functions of multifunction printer 16. Controller 54 preferably includes hardware, software, firmware or combination of these. In one embodiment, controller 54 includes a microprocessor-based system or other system capable of performing a sequence of logical operation and including memory for storing information.

Text editor 65 comprises a text editor or word processing program for electronically editing electronic printable file 27 as a text editable file.

Optical character recognition function 66 is stored in memory 33 and is configured to perform optical character recognition processes on digital image files 60 of printed pages 13 including text 14 and/or handwritten edit symbols 15 to produce electronic printable files 27 which are editable by edit manager 67. Optical character recognition 66 also optically recognizes an electronic identifier of printed pages 13, which is described in more detail in association with FIGS. 5-6.

Edit manager 67 is stored in memory 33 and is accessible via user interface 22. Edit manager 67 acts in cooperation with controller 54 to carry out functions of multifunction printer 16 related to electronically implementing handwritten edit symbols 15 on printed page(s) 13 to produce printed pages 18 that have text 14 modified according to handwritten edit symbols 15. Edit manager 67 is described in greater detail in association with FIG. 3.

Printer driver 80 of multifunction printer 16 comprises printer control language (PCL) driver 82, as well as other drivers such as printable document format (PDF) drivers, PostScript drivers, etc. that support editing and printing of electronic printable files 27. Print job queue 84 tracks pending printing jobs and tracks recently printed documents. In cooperation with user interface 22, print job queue 84 permits a user to identify that printed page 13 being fed into multifunction printer 16 corresponds to a particular print job number in print job queue, such as the last document printed or by print job number (e.g., print job number 5 on Jul. 28, 2003).

Figure 5:
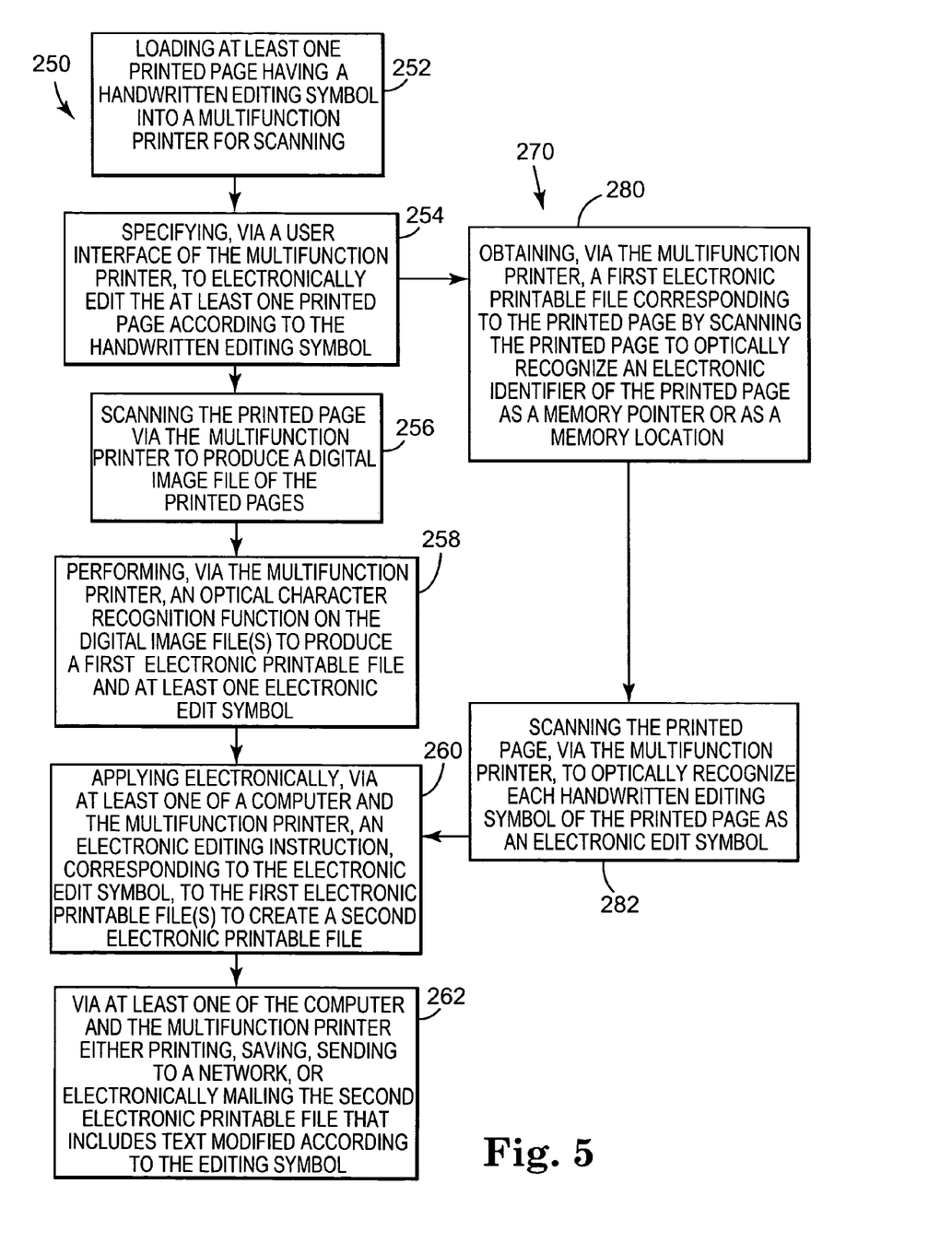
FIG. 5 is a flow diagram of a method of electronically editing a document with a multifunction printer, according to an embodiment of the present invention.
Figure 6:
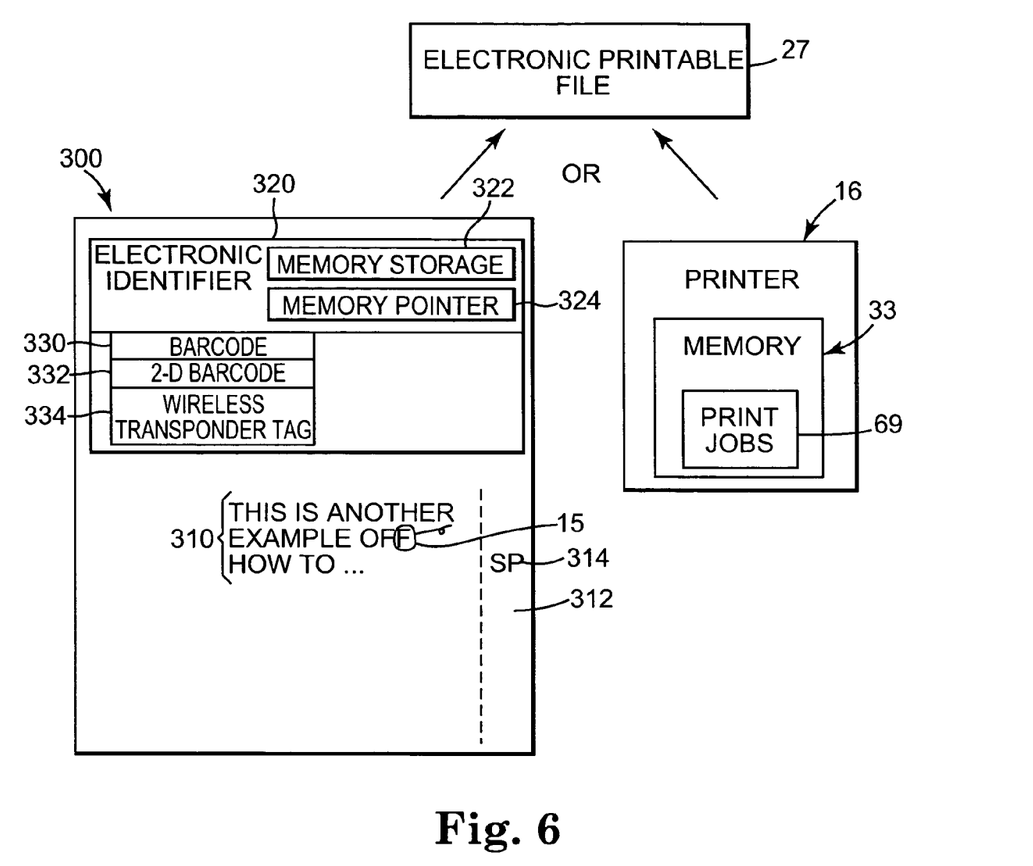
FIG. 6 is an illustration of a memory source for storing an electronic printable file, according to an embodiment of the present invention.

Printer driver 80 of multifunction printer 16 also comprises barcode driver 86, which enables scanner 20 to optically read both one-dimensional and two-dimensional barcodes appearing on printed pages 13 as electronic identifiers (described in association with FIGS. 5-6). In some embodiments, barcode driver 86 also enables printing mechanism 50 to print one-dimensional and two-dimensional barcodes onto printed pages 18 to replicate a barcode appearing on printed pages 13 or to add a barcode to printed pages 18 as an electronic identifier of electronic printable file 27 for future reference and identification. Barcode driver 86 can be omitted in some embodiments of multifunction printer 16.

Multifunction printer 16 also comprises application specific integrated circuit (ASIC) 90, which can be omitted in some embodiments. Application specific integrated circuit 90 comprises edit manager 67 and optical character recognition function 66, and which may incorporate controller 54. Application specific integrated circuit 90 is removably insertable into multifunction printer 16 for upgrading a conventional multifunction printer 16 with edit manager 67 and optical character recognition 66 to perform method 10 of electronically editing a printed page with multifunction printer 16. In addition, application specific integrated circuit 90 can be used with new multifunction printers 16 as a convenient way to incorporate components into a single module for carrying out method 10. For example, in some embodiments, application specific integrated circuit 90 also comprises additional components, such as bar code driver 86, additional memory for storing electronic printable files 27, digital image files 60, etc.

Wireless transceiver 92 comprises a transceiver configured for wireless communication with a reciprocal wireless transponder printed page(s) 12 and is capable of one or more types of wireless communication, including but not limited to, magnetic induction, short-range radiofrequency, radiofrequency, infrared, and other known wireless communication protocols. Wireless transceiver 92 can be omitted from multifunction printer 16 in some embodiments.

Computer 32 comprises optical character recognition module 66 and memory 98, as well as comprising text editor 65, edit manager 67 and electronic printable files 27. In some embodiments, computer 32 can be used with multifunction printer 16 to perform a method of electronically editing printed pages 13. Computer 32 is configured to assist in performing functions such as optically recognizing text 14 of printed pages 13 as well as performing some aspects of applying electronic editing instructions to electronic printable file 27. In one aspect of method 10, electronic printable file 27 comprises a text editable file and computer 32 applies electronic edit instructions to electronic printable file 27 via text editor 65 of computer 32. This feature alleviates multifunction printer 16 from the memory intensive demands of storing and operating text editor 65, while edit manager 67 of multifunction printer 16 still directs recognition and identification of electronic edit symbols that correspond to handwritten edit symbols 15 on printed pages 13.

Accordingly, depending upon the embodiment, edit manager 67 can be deployed in either memory 33 of multifunction printer 16, application specific integrated circuit 90 of multifunction printer 16, or in computer 32. Likewise, depending upon the embodiment, optical character recognition 66 can be deployed in either memory 33 of multifunction printer 16, application specific integrated circuit 90 of multifunction printer 16, or from computer 32

Figure 3:
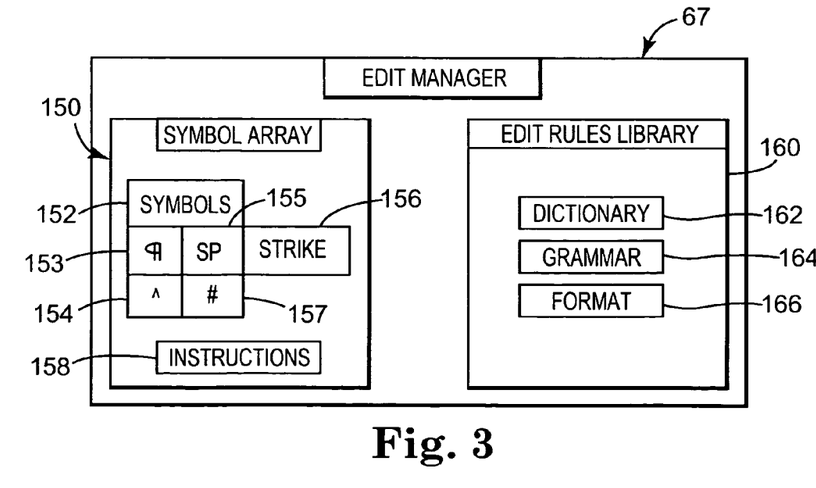
FIG. 3 is block diagram of an edit manager of the multifunction printer, according to an embodiment of the present invention.

FIG. 3 illustrates edit manager 67 in greater detail. As shown in FIG. 3, edit manager 67 comprises symbol array 150 and edit rules library 160. Symbol array 150 comprises edit symbols 152 and electronic edit instructions 158. Edit symbols 152 include, but are not limited to, paragraph symbol 153, insert symbol (^) 154, spelling symbol (sp) 155, strikeout symbol (-----) 156, and space symbol (#) 157. In some embodiments, symbols 152 include the full selection of standard edit symbols well known to those in the art of editing.

Edit symbols 152 of symbol array 150 are used to in cooperation with electronic edit instructions 158 so that upon optical recognition of a handwritten edit symbol 15 on printed page 13 as an electronic edit symbol 152 via optical character recognition module 66, edit manager 67 looks to symbol array 150 to identify an electronic edit instruction from instructions 158 that corresponds to the recognized handwritten edit symbol 15. The selected electronic edit instruction 158 is then used to reflow or modify the page description file 62, 63 or text editable file 61 for printing printed page 18 (FIG. 1), which includes text 14 modified according to the handwritten edit symbol(s) 15.

For example, for the handwritten editing paragraph symbol (¶), a corresponding electronic edit instruction 158 is retrieved via electronic edit symbol 153 and includes adding a hard carriage return, adding an indent, and adding a line space before the text location marked with the paragraph symbol 153. An electronic edit instruction 158 for the strike symbol (-----) is retrieved via electronic edit symbol 156 and specifies that for each character over which the handwritten strikeout symbol extends, those characters will be deleted or replaced with blanks from their positions within electronic printable file 27. Finally, an electronic edit instruction 158 for handwritten spelling symbol (sp) is retrieved via electronic edit symbol 155 and comprises comparing a word marked with the spelling symbol (sp) with comparable words from an electronic dictionary (e.g., dictionary 162 in FIG. 3) and replacing the marked word in text 14 with the closest match from the dictionary.

Edit rules library 160 of edit manager 67 contains rules and words for implementing handwritten edit symbols, including correcting spelling, grammatical, and format errors in printed page 13. As shown in FIG. 3, edit rules library 160 comprises dictionary 162, and in some embodiments, further comprise grammar module 164 and/or format module 166.

Dictionary 162 supplies the correct spelling of words, while grammar module 164 contains rules of grammar, and format module 166 holds standard textual formats for text documents. Accordingly, edit rules library 160 is used in cooperation with symbol array 150 to implement various edit symbols. For example, a spelling edit symbol (sp) 150 triggers use of dictionary 162 to determine the correct spelling of a word in text 14 of printed page 13. Once the proper spelling of the word is found, then the properly spelled word is inserted into page description file corresponding to printed page 13 to modify text 14 with the correctly spelled word. Dictionary function 162 also works in cooperation with grammar module 164 in determining a correct spelling of words in the context of the sentence being edited.

In some embodiments, edit rules library 160 also is used in cooperation with optical character recognition function 66 to review and correct errors in printed page 13 that are not identified by handwritten edit symbols 15.

Figure 4:
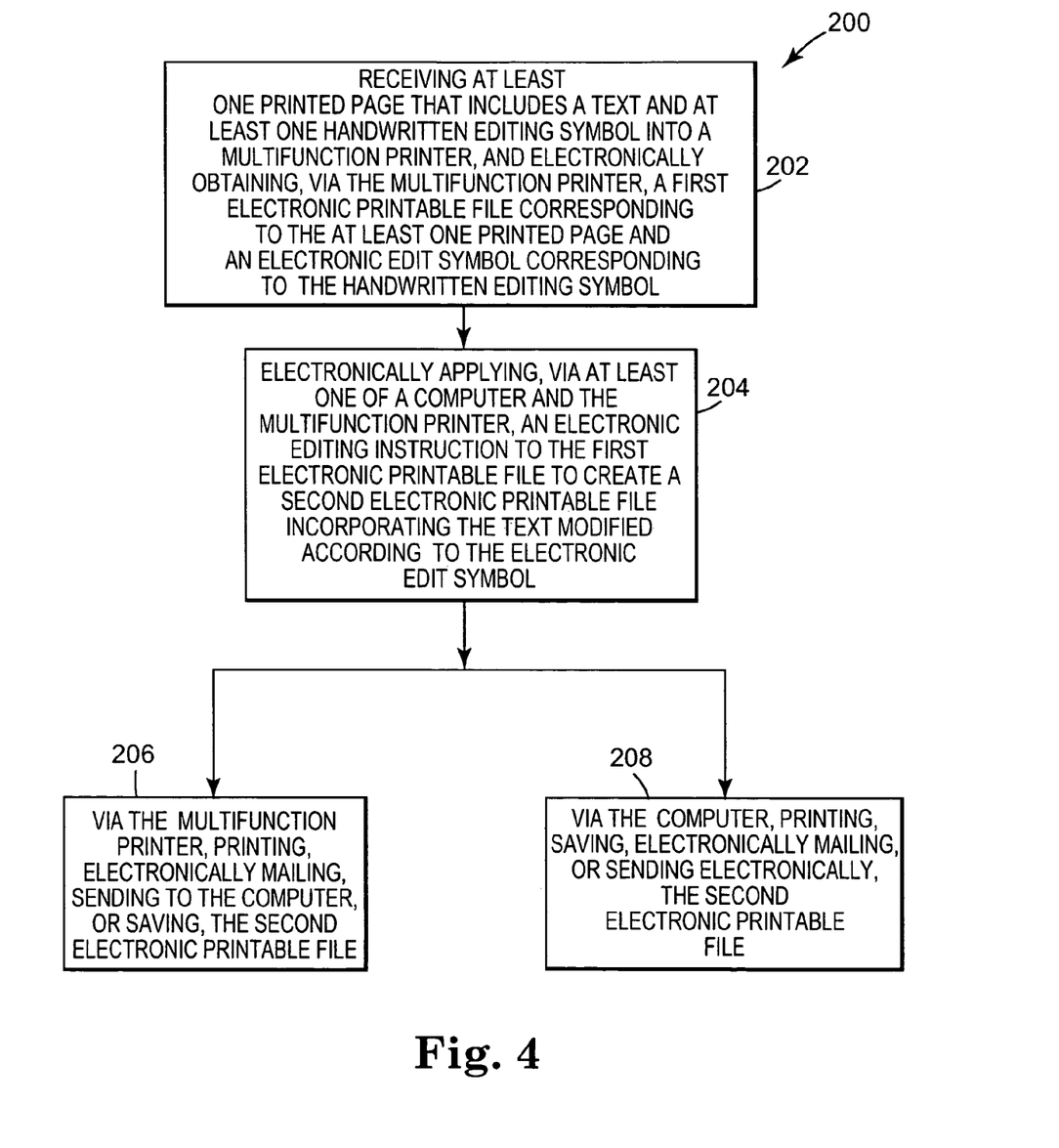
FIG. 4 is a flow diagram of a method of electronically editing a document with a multifunction printer, according to an embodiment of the present invention.

As described in association with FIG. 4, in addition to performing a method electronically editing printed pages 13 with edit manager 67 of multifunction printer 16, in some embodiments, a second edit manager 67 is embodied in computer 32 to assist in perform a method of electronically edit printed pages.

FIG. 4 is a flow diagram illustrating method 200 of the present invention for using multifunction printer 16 to electronically edit printed page(s) 13. The systems of FIGS. 1-3 are suitable for performing method 200.

One aspect of method 200 comprises receiving one or more printed pages of a printed document into a multifunction printer and electronically obtaining, via the multifunction printer first electronic printable file 27A corresponding to printed pages (shown by box 202). The printed page(s) comprise text and at least one handwritten edit symbol (see FIG. 1).

Another aspect of method 200 (shown in box 204) comprises electronically applying, via at least one of a computer and a multifunction printer, an electronic edit instruction from an edit manager to a first electronic printable file to create a second electronic printable file, which comprises the text of the printed page modified according to the handwritten edit symbol.

In one aspect of method 200, the multifunction printer applies electronic edit instructions to the electronic printable file, independent of a host computer. In another aspect of method 200, the multifunction printer performs these functions with the assistance of the host computer. Particular aspects of the assistance of computer are described in association with FIG. 5.

Once the second electronic printable file has been produced, method 200 comprises handling the second electronic printable file for communication or storage as shown in boxes 206 and 208 of FIG. 4. As shown in box 206, one aspect of method 200 comprises, via the multifunction printer, printing the second electronic printable file, sending the second electronic printable file via the digital sender of the multifunction printer, sending the second electronic printable file to the computer, and/or storing the second electronic printable file in the memory of the multifunction printer.

As also shown in box 208, another aspect of method 200 comprises using the computer to direct printing of the second electronic printable file at the multifunction printer or another printer, digitally sending the second electronic printable file, saving the second electronic printable file in memory 98, or sending the second electronic printable file to another location (e.g. network memory location).

FIG. 5 is a flow diagram illustrating method 250 for using a multifunction printer to electronically edit one or more printed pages. Method 250 comprises a more detailed aspect of method 200.

One aspect of method 250 comprises feeding (e.g., loading) one or more pages of a printed document into a multifunction printer for scanning (as shown in box 252). Each printed page comprises text, such as characters, words, punctuation, etc. and includes one or more handwritten edit symbols.

Another aspect of method 250 comprises specifying, via an user interface of the multifunction printer, a command to electronically edit the printed page(s) according to handwritten edit symbols (shown in box 254).

As shown in box 256, method 250 also comprises scanning the printed page(s), via the multifunction printer, to produce a digital image file of the printed pages. This aspect of method 200 is typically performed by first scanning the one or more printed pages with a scanner of the multifunction printer to produce a digital image file.

As shown in box 258, method 250 also comprises performing, via the multifunction printer, an optical character recognition function on the digital image file to produce a first electronic printable file, which is an electronic representation of the text of the printed pages. This aspect of method 200 also comprises optically recognizing handwritten edit symbols as electronic edit symbols from the digital image file via the optical character recognition function.

As shown in box 260, method 250 comprises applying electronically, via an edit manager of the multifunction printer, an electronic edit instruction that corresponds to handwritten edit symbol in order to modify the first electronic printable file to create a second electronic printable file (e.g., a revised electronic document). To do so, the edit manager uses each electronic edit symbol to identify an electronic edit instruction for carrying out the editing steps to implement the corresponding handwritten edit symbol. As shown in box 262, method 250 comprises, via at least one of the multifunction printer and a computer, printing, saving, sending to a network, or electronically mailing the second electronic printable file including text modified according to handwritten edit symbol(s).

Method 250 also includes an alternative pathway 270, as shown extending from box 254. Alternative pathway 270 is employed when an electronic printable file is available for editing so that text of printed pages need not be scanned and optically recognized as part of electronically editing the printed document, as occurs in boxes 256 and 258 of method 250.

In one aspect of method 250 (shown in box 280) in alternate pathway 270 comprises obtaining, via a multifunction printer, a first electronic printable file corresponding to the printed page(s) without scanning and without optically recognizing text of the printed pages. For example, this aspect can include, but is not limited to, scanning and optically recognizing an electronic identifier of the printed pages as a memory pointer or as a memory storage, each of which are described in more detail in association with FIG. 6. The electronic identifier points to and/or comprises a memory storage from which the electronic printable file can be retrieved by the multifunction printer.

Another aspect associated with method 250 in pathway 270 shown in box 282 of FIG. 4 comprises scanning the printed page to optically recognize each handwritten edit symbol of printed page as a corresponding electronic edit symbol.

This aspect of method 250 is followed by an aspect of method 250 in which an edit manager uses the electronic edit symbol to identify a corresponding electronic edit instruction and then applies each electronic edit instruction to the first electronic printable file, as shown in box 260. The edit manager of either the computer and/or the multifunction printer are used to identify an electronic edit instruction based on an electronic edit symbol (corresponding to the handwritten edit symbol) and apply the electronic edit instruction to modify a page description file or text editable file that comprises the first electronic printable file.

As previously identified in connection with alternative pathway 270 of method 250, FIG. 6 illustrates ways of obtaining the electronic printable file other than by scanning text of the printed page(s). Electronic editing of the printed page(s) can be performed faster if an electronic text corresponding to text of the printed page(s) is already available. For example, electronic printable file 27 can be obtained electronically either directly from memory 33 of printer 16 where prior print jobs 69 are stored or via electronic identifier 320, as further described below. This arrangement would eliminate optically recognizing text 14, since an electronic version of the text is already-available. Accordingly, only handwritten edit symbols 15 would have to be scanned and optically recognized by multifunction printer 16.

As shown in FIG. 6, printed page 300 comprises text 310 and edit symbol 314 in margin 312 of printed page 300. In some embodiments, printed page 300 also comprises electronic identifier 320. Electronic identifier 320 comprises at least one of memory pointer 324, that points to a memory location external of printed page 300, 13 storing electronic printable file 27, and memory storage 322 that electronically stores electronic printable file 27 within electronic identifier 320 on printed page 300, 13.

Electronic identifier 320 comprises several formats including, but not limited to, a one-dimensional barcode, a two-dimensional barcode, a wireless transponder tag and/or other electronically readable memory elements. In one embodiment, electronic identifier 320 comprises a one-dimensional barcode configured for acting as memory pointer 324 that points to a memory location (e.g. uniform resource locator address, network address, memory 33 of multifunction printer 16, memory 98 of computer 32, etc.) where electronic printable file 27 of printed page 300 is stored and can be retrieved via multifunction printer 16. However, in other embodiments, electronic identifier 320 also comprises a two-dimensional barcode, such as a barcode in the PDF417 format as specified by the PDF417 Uniform Symbology Specification by the Automatic Identification and Data Capture (AIDC) industry. This two-dimensional barcode stores an entire portable data file, such as a printable document format file, within the barcode pattern. Such barcode formats are available in a memory chip (e.g., HP JETCAPS BarDIMM) that enables a multifunction printer to both print and scan two-dimensional barcodes according to the PDF417 format. Accordingly, when electronic identifier 320 is embodied as a two-dimensional bar code, electronic identifier 320 acts as a memory storage 322 that stores electronic printable file 27 corresponding to printed page 300. In the alternative, electronic identifier 320 acts as memory pointer 324 to an external storage location.

Alternatively, in some embodiments, electronic identifier 320 can be embodied as a wireless transponder tag 334 that acts as a memory pointer 324 to an external location (memory 33 of printer 16, memory 98 of computer 32, network address, or uniform resource locator address, etc) that stores electronic printable file 27 of printed page(s) 13. Wireless transceiver 92 of multifunction printer 16 (see FIG. 2) contains the appropriate antenna, power source, and transceiver to communicate with wireless transponder tag 334 for retrieving electronic printable file 27 via wireless transponder tag 334 as a memory pointer 324.

Embodiments of the present invention enable editing a printed pages via a multifunction printer. A user need not return to a computing device to electronically implement edits on a document. Instead, standard edit symbols are handwritten directly on one or more printed pages. Those printed pages are fed into a multifunction printer which recognizes the edits and applies them electronically to an electronic copy of the printed pages. A revised electronic copy of the printed pages is either printed, stored, or digitally sent to a recipient as a text file or an image file. Accordingly, the handwritten edits are implemented without the use of a computer. However, in some embodiments, a computer may be used in association with the multifunction printer to apply electronic editing instructions to the electronic copy of the printed pages after the printed pages are initially received by the multifunction printer for editing.

While specific embodiments have been illustrated and described, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method of editing a printed page, comprising:
   automatically scanning, via a multifunction printer, the printed page, wherein the printed page includes text and at least one handwritten edit symbol;
   electronically obtaining, via the multifunction printer, a first page description file, which corresponds to at least the text on the printed page;
   electronically identifying from the scanned printed page, via optical recognition from the multifunction printer, at least one electronic edit symbol from a first array of electronic edit symbols stored in a memory of the multifunction printer, which corresponds to the at least one handwritten edit symbol; and
   electronically and automatically modifying, via the multifunction printer and a computer in communication with and in cooperation with the multifunction printer, the first page description file using the at least one electronic edit symbol to create a second page description file that includes the text modified according to the at least one handwritten edit symbol, wherein electronically and automatically modifying the first page description file comprises:
      retrieving at least one electronic edit instruction from a second edit symbol array stored in the computer; and
      applying, at the computer, the at least one electronic edit instruction to the first page description file.

2. The method of claim 1 and further comprising at least one of:
   printing the second page description file to at least one of the multifunction printer and a second printer;
   digitally sending the second page description file to a recipient, storing the second page description file in a memory; or
   sending the second page description file to a memory location external of the multifunction printer.

3. The method of claim 1 wherein electronically obtaining the first page description file comprises:
   obtaining a digital image file of the printed page by scanning the printed page with a scanner of the multifunction printer and optically recognizing the digital image file, via the multifunction printer, for conversion to the first page description file.

4. The method of claim 1 wherein electronically obtaining the first page description file comprises:

optically recognizing, via the multifunction printer, an electronic identifier of the printed page as an electronic memory pointer and, based on the electronic memory pointer, retrieving the first page description file from a memory of the multifunction printer or a memory available at a uniform resource locator address.

5. The method of claim 1 wherein electronically obtaining the first page description file comprises:
optically recognizing, via the multifunction printer, an electronic identifier of the printed page as a memory and retrieving the first page description file from the memory of the electronic identifier.

6. The method of claim 1 wherein electronically obtaining the first page description file comprises:
wirelessly retrieving, via the multifunction printer, an electronic identifier as a memory pointer from the printed page and based on the memory pointer, electronically retrieving the first page description file from at least one of a memory of the multifunction printer and a memory available at a uniform resource locator address.

7. A multifunction printer implementing the method of claim 1.

8. The multifunction printer of claim 7 further comprising an optical character recognition function configured to optically recognize at least one of:
the text from the scanned printed page as the first page description file; and
an electronic identifier of the scanned printed page for use as a memory pointer that points to an external memory location and retrieving the first page description file from that external memory location; and
an electronic identifier of the scanned printed page for use as a memory storage that stores the first page description file and retrieving the first page description file from that memory storage.

9. The multifunction printer of claim 7 further comprising a user interface comprising at least one of:
an electronic mail function configured to permit specifying an electronic mail address to which the second page description file will be digitally sent by the multifunction printer;
a print function configured to permit specifying that the second page description file be printed by the multifunction printer;
a save function configured to permit specifying that the second page description file be saved in the memory of the multifunction printer; or
a send function configured to permit sending the second page description file in a memory location external of the multifunction printer.

10. The multifunction printer of claim 7 further comprising an edit manager having:
an edit rules library configured to support application of the electronic editing instructions of the edit symbol array and including at least one of a grammar function, a dictionary function, and a format function.

11. The multifunction printer of claim 7 wherein an optical character recognition function is stored in at least one memory of the multifunction printer, a controller of the multifunction printer, and an application specific integrated circuit.

12. The multifunction printer of claim 7 wherein the multifunction printer comprises a wireless transceiver configured for communication with a wireless transponder tag of the at least one printed page with the wireless transponder tag being configured as a memory pointer that identifies a memory location storing the first page description file.

* * * * *